US011029895B2

United States Patent
Paine et al.

(10) Patent No.: US 11,029,895 B2
(45) Date of Patent: Jun. 8, 2021

(54) TECHNOLOGIES FOR POSITIONING DESIGNS ON VIRTUAL SURFACES ASSOCIATED WITH PRODUCT CUSTOMIZATION

(71) Applicant: CIMPRESS SCHWEIZ GMBH, Winterthur (CH)

(72) Inventors: Harrison Paine, Arlington, MA (US); David Greenberg, Framingham, MA (US); Anatoliy Tsykora, Wayland, MA (US); Vikramaditya Khemka, Belmont, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 0 days.

(21) Appl. No.: 16/681,439

(22) Filed: Nov. 12, 2019

(65) Prior Publication Data

US 2021/0141576 A1    May 13, 2021

(51) Int. Cl.
  *G06F 3/12*    (2006.01)
(52) U.S. Cl.
  CPC .......... *G06F 3/1208* (2013.01); *G06F 3/1205* (2013.01); *G06F 3/1252* (2013.01); *G06F 3/1255* (2013.01); *G06F 3/1256* (2013.01)
(58) Field of Classification Search
  CPC .... G06F 3/1208; G06F 3/1205; G06F 3/1252; G06F 3/1253; G06F 3/1255; G06F 3/1256; G09G 2340/00; G09G 2340/0442; G09G 2340/04
  See application file for complete search history.

(56) References Cited

U.S. PATENT DOCUMENTS

| 10,356,277 | B1 | 7/2019 | Hossepian |
| 2008/0151322 | A1 | 6/2008 | Morales et al. |
| 2009/0168081 | A1* | 7/2009 | Takasaki ............... G06F 3/1207 358/1.2 |
| 2010/0088584 | A1 | 4/2010 | Pangrazio, III et al. |
| 2013/0067434 | A1 | 3/2013 | Gnanasambandam et al. |
| 2013/0194621 | A1* | 8/2013 | Sweet ................... G06F 3/1205 358/1.15 |

OTHER PUBLICATIONS

International Application No. PCT/IB2020/060382, International Search Report and Written Opinion, dated Jan. 25, 2021.

* cited by examiner

*Primary Examiner* — Iriana Cruz
(74) *Attorney, Agent, or Firm* — Marshall, Gerstein & Borun LLP (57) ABSTRACT

Systems and methods for placing visual content on a virtual surface for customizing a physical product are disclosed. According to certain aspects, an electronic device may, in conjunction with enabling a user to customize a product design, access and identify certain parameters associated with certain page boxes of the electronic document. The electronic device may calculate a set of differences between certain aspect ratios associated with the page boxes, and accordingly modify certain parameters of the page boxes. The resulting page box modifications may mitigate certain errors associated with production of the product.

16 Claims, 7 Drawing Sheets

TECHNOLOGIES FOR POSITIONING DESIGNS ON VIRTUAL SURFACES ASSOCIATED WITH PRODUCT CUSTOMIZATION

FIELD

The present disclosure is directed to improvements related to product customization. More particularly, the present disclosure is directed to platforms and technologies for reducing undesirable features or errors associated with production of products based on digital designs of the products.

BACKGROUND

Individuals or customers frequently purchase or order products or items for certain applications or uses. For example, an individual may order customized printed products such as brochures and business cards associated with a business. Conventionally, individuals may use online design studios to customize the designs to be applied to certain products. These online design studios typically enable the individuals to modify or adjust the designs prior to the products being produced or printed.

A given product may have a "full bleed" design in which the design is intended to be physically printed to one or more of the edges of the substrate without a corresponding margin(s). To reduce production errors, a bleed box may be specified for a given document which may be extend a certain distance (e.g., ⅛") from a trim box (i.e., parameters which define the dimensions what is ostensibly the trimmed product). However, defining and modifying bleed and trim box parameters in the design phase can be onerous. Additionally, errors may occur during the actual production or printing of completed designs. Accordingly, a produced product that has a full bleed design may not actually end up with a correct full bleed effect.

Thus, there is an opportunity for systems and methods to effectively and efficiently position designs on virtual surfaces to reduce errors in product production.

SUMMARY

In an embodiment, a computer-implemented method of placing visual content on a virtual surface for customizing a physical product is disclosed. According to embodiments, the method may include: accessing, by a computer processor, an electronic document comprising the visual content and specifying a set of page boxes having a set of page box parameters, identifying (i) a surface trim box defining the physical product placed on the virtual surface, the surface trim box having a set of sizing parameters defining a surface aspect ratio, and (ii) a document trim box included in the set of page boxes of the electronic document, the document trim box having a set of sizing parameters defining a document aspect ratio, calculating, by the computer processor, a difference between the surface aspect ratio and the document aspect ratio, and based on the difference, modifying at least a portion of the set of page box parameters.

In another embodiment, an electronic device for placing visual content on a virtual surface for customizing a physical product is disclosed. According to embodiments, the electronic device may include a user interface for displaying content; a memory storing non-transitory computer executable instructions; and a processor interfacing with the user interface and the memory, wherein the processor is configured to execute the non-transitory computer executable instructions to cause the processor to: access an electronic document comprising the visual content and specifying a set of page boxes having a set of page box parameters, identify (i) a surface trim box defining the physical product placed on the virtual surface, the surface trim box having a set of sizing parameters defining a surface aspect ratio, and (ii) a document trim box included in the set of page boxes of the electronic document, the document trim box having a set of sizing parameters defining a document aspect ratio, calculate a difference between the surface aspect ratio and the document aspect ratio, and based on the difference, modify at least a portion of the set of page box parameters.

DETAILED DESCRIPTION

The present embodiments may relate to, inter alia, platforms and technologies for placing visual content on a virtual surface for customizing a physical product. According to certain aspects, an individual or customer may use an electronic device to customize, via a user interface, a design for a physical product in contemplation of ordering the physical product, where the design may be embodied as an electronic document.

While customizing the design, the user may modify the design (e.g., the overall shape and/or size of the design) and/or certain elements of the design. In response to the user customizing the design, the electronic device may determine how a set of page boxes associated with the electronic document may need to be modified. In particular, the electronic device may calculate a set of differences between certain aspect ratios of certain of the set of page boxes. Based on the calculated set of differences, the electronic device may modify certain parameters of the set of page boxes. In this regard, the set of page boxes may be configured such that printing errors that are otherwise commonly associated with trim and bleed box parameters may be avoided.

The systems and methods therefore offer numerous benefits. In particular, the dynamic adjustment and modification of page box parameters reduces errors associated with the production or printing of products. Additionally, the systems and methods may generate a set of preview images to enable a user to select a preferred design that also aligns with modified page box parameters. Because of the reduction in production errors, platforms that offer customized product production may realize reduced costs, greater profits, and increased sales. It should be appreciated that additional benefits are envisioned.

The systems and methods discussed herein improve the functioning of a computer as well as virtual design platforms. Conventionally, page boxes associated with an electronic document are manually set without visibility from a user. When a product design associated with the electronic document is modified, the page boxes do not correspondingly modify. As a result, there may be unwanted effects (e.g., whitespaces, too much bleed, etc.) in a produced, final product. The systems and methods are an improvement to how the computer modifies virtual designs because the systems and methods automatically and dynamically calculate differences between various aspect ratio pairs and modify corresponding parameters of certain of the page boxes. In doing so, the systems and methods may apply various scaling factors to design elements needed to match certain page box parameters, among other functionalities.

Figure 1A:
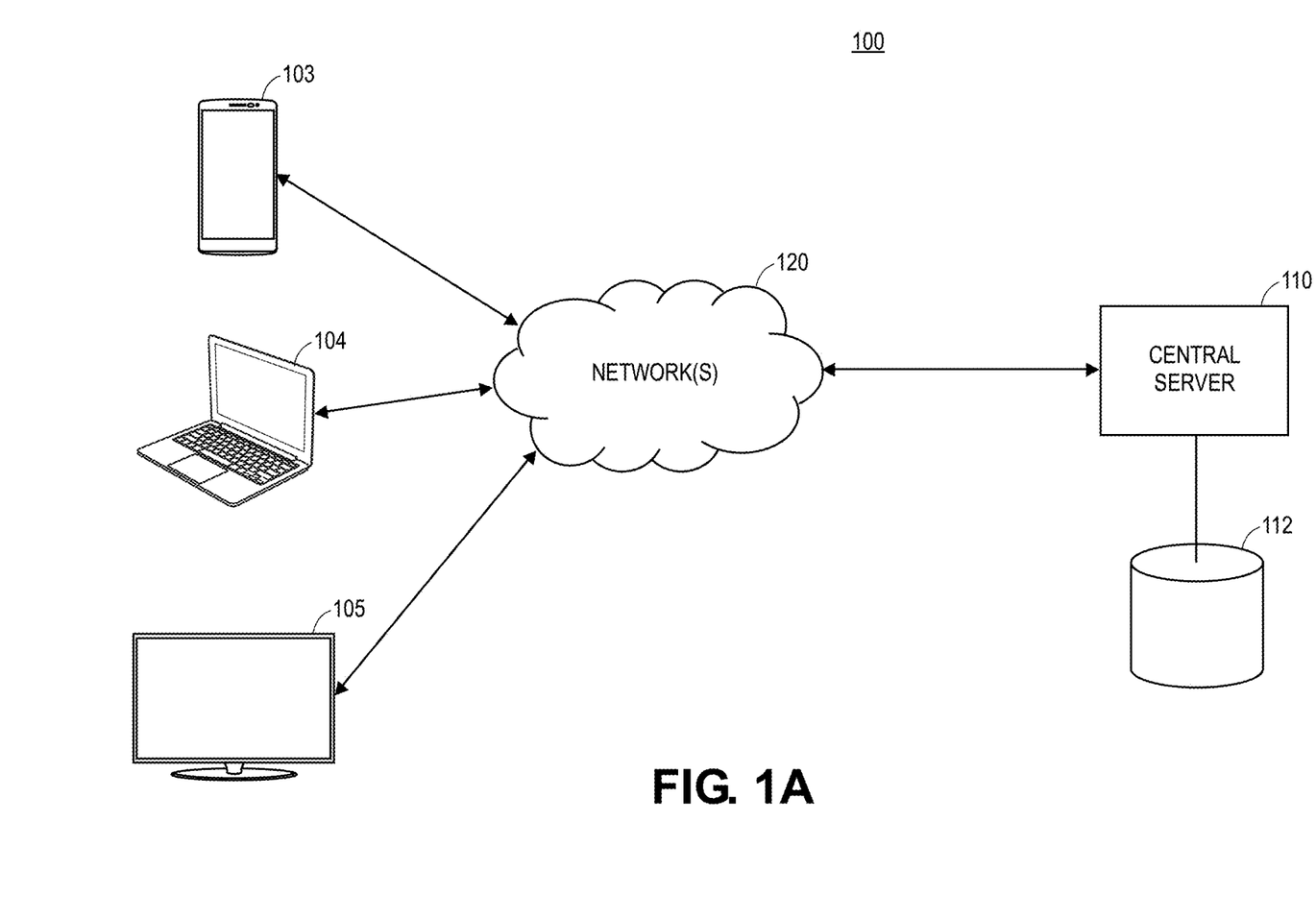
FIG. 1A depicts an overview of components and entities associated with the systems and methods, in accordance with some embodiments.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 103, 104, 105 which may be used or operated by a set of users, such as any individual or person who may be interested in purchasing items, products, and/or services that may be offered for sale by an entity. In an embodiment, the entity may be a corporation, company, partnership, retailer, wholesaler operating on behalf of another entity (e.g., a white label wholesaler), or the like, where the entity may offer an e-commerce platform (e.g., a website accessible by or an application executable by the electronic devices 103, 104 105) and optionally a set of brick-and-mortal retail stores. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 104 105 may communicate with a central server 110 via one or more networks 120. The central server 110 may be associated with the entity that owns and/or manages the e-commerce platform(s) and/or the set of brick-and-mortal retail stores. In particular, the central server 110 may include or support a web server configured to host a website that offers various products and/or services for purchase by users. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with products or services that are offered for sale by the entity that owns and/or manages the e-commerce platform and/or the set of brick-and-mortal retail stores. For example, the storage 112 may store information associated with office supplies such as business cards and notepads, including information associated with a customer or client (e.g., company name and logo). For further example, the storage 112 may store templates of designs, as well as information associated with the designs, including properties and dimensions of the elements/components of the designs.

Although three (3) electronic devices 103, 104, 105, and one (1) server 110 are depicted in FIG. 1A, it should be appreciated that greater or fewer amounts are envisioned. For example, there may be multiple central servers, each one associated with a different entity. Additionally, the electronic devices 103, 104, 105 and the central server 110 may interface with one or more separate, third-party servers (not depicted in FIG. 1A) to retrieve relevant data and information.

Figure 1B:
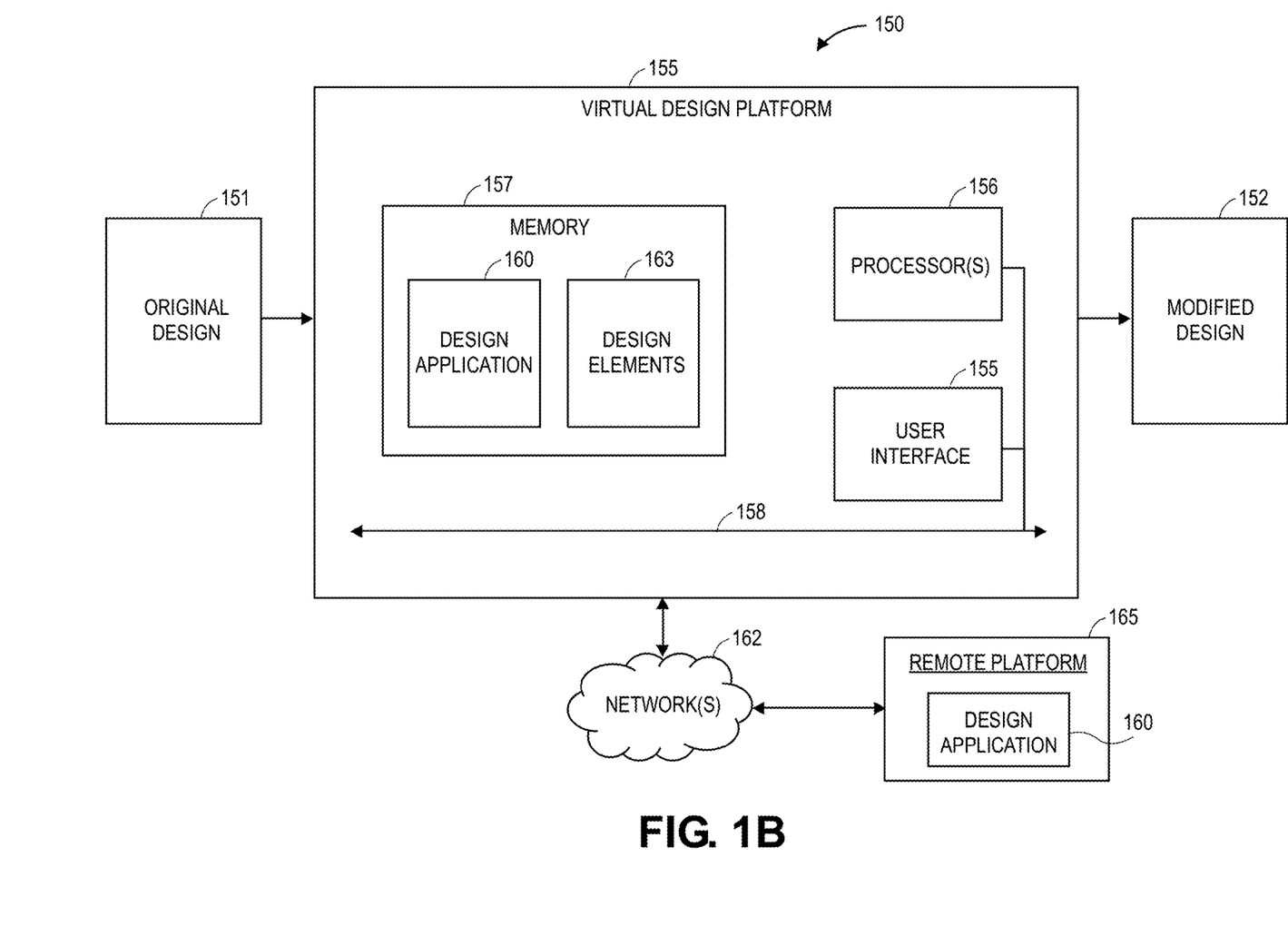
FIG. 1B depicts an overview of certain components configured to facilitate the systems and methods, in accordance with some embodiments.

According to embodiments, users of the electronic devices 103, 104, 105 may select a design(s) of an item to preview and modify using the electronic devices 103, 104, 105, such as in contemplation of placing an order for the item(s). The design(s) may include a set of design elements, each of which has a characteristic or property (e.g., as defined by metadata). In particular, the set of design elements may be at least partially embodied as a set of page boxes (e.g., media box, bleed box, trim box, and art box), where other design elements may be various visual content such as images, artwork, text, and/or the like. The users may use the respective electronic devices 103, 104, 105 to modify certain of the design elements. In particular, the users may specify how certain product designs should be placed or positioned on a virtual surface. In response, the respective electronic devices 103, 104, 105 (or in some cases, the central server 110) may determine how to modify certain of the design elements such that the end product aesthetically aligns with the design and is positioned to reduce or eliminate production errors. The electronic devices 103, 104, 105 may also display various design options for review and selection by the users. FIG. 1B depicts more specific components associated with the systems and methods.

FIG. 1B an example environment 150 in which an original design 151 is processed into a modified design 152 via a virtual design platform 155, according to embodiments. The virtual design platform 155 may be implemented on any computing device, including one or more of the electronic devices 103, 104, 105 or the server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The virtual design platform 155 may further include a user interface 153 configured to present content (e.g., designs and components/elements thereof). Additionally, a user may make selections to the content via the user interface 153, such as to modify designs (or design elements thereof) presented thereon. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a design application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The virtual design platform 155 may operate in a networked environment and communicate with one or more remote platforms, such as a remote platform 165, via a network 162, such as a local area network (LAN), a wide area network (WAN), or other suitable network. The platform 165 may be implemented on any computing device, including one or more of the electronic devices 103, 104, 105 or the server 110 as discussed with respect to FIG. 1A, and may include many or all of the elements described above with respect to the platform 155. In some embodiments, as will be described herein, the design application 160 as will be further described herein may be stored and executed by the remote platform 165 instead of by or in addition to the platform 155.

According to embodiments, the virtual design platform 155 (and more particularly, the design application 160) may process or modify the original design 151 to produce the modified design 152. It should also be understood that although only one of each of the original design 151 and the modified design 152 is shown, the example environment 150 may be configured to process or modify multiple designs.

Each of the original design 151 and the modified design 152 may be embodied as any type of electronic document, file, template, etc., that may include a set of design elements or components, each of which may be some type of displayable content (e.g., a combination of textual and/or visual content).

The memory 157 may further store design elements 163 accessible to the design application 160. According to embodiments, the design application 160 may process the original design 151 by modifying, deleting, inserting, and/or replacing certain of the set of design elements, or parameters thereof, included in the original design 151. In particular, the design application 160 may modify or replace certain values associated with one or more page boxes associated with the original design 151. Each of the design elements included in the original design 151 and in the design elements 163 may have associated metadata that may define how the corresponding design element is to be presented within the original design 151 and/or modified based on a modification(s) to another design element(s). In embodiments, the designs 151, 152, the design elements, and the metadata thereof may be implemented using any type of file format. For example, the metadata may be in JavaScript Object Notation (JSON) format, or another format(s). Additionally, various formats for the electronic document are envisioned (e.g., PDF, DOC, HWP, ODT, PAGES, RTF, etc.).

According to embodiments, the set of page boxes may each of have a respective set of page box parameters that may define an aspect ratio. The design application 160 may identify and certain of the page boxes and parameters thereof, determine corresponding aspect ratios of the page boxes, and calculate differences between the aspect ratios. Based on the calculated differences, the design application 160 may modify at least a portion of the set of page box parameters. These functionalities are further discussed with respect to FIGS. 2, 3, 4A, 4B, and 5.

Figure 2:
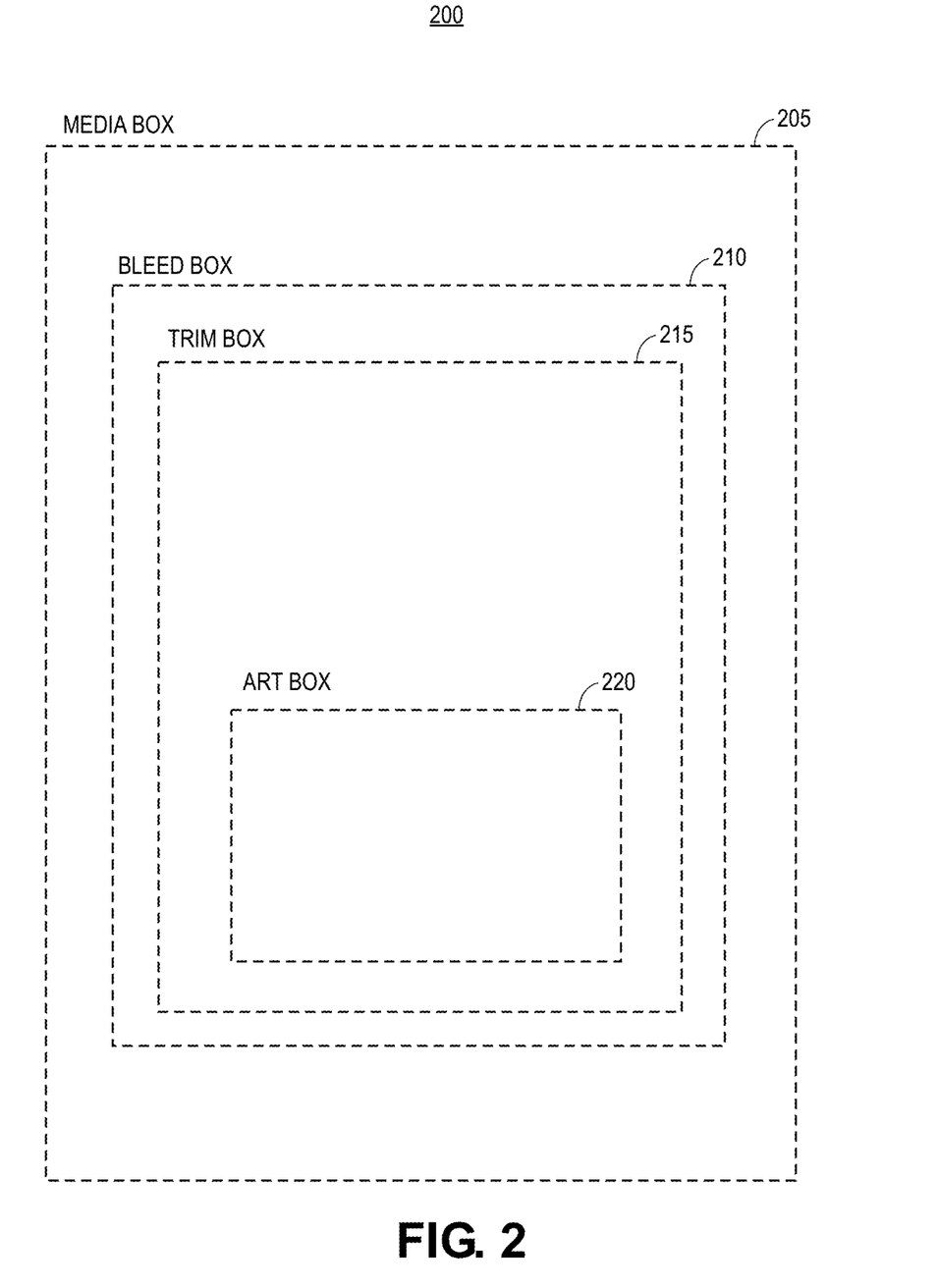
FIG. 2 depicts an electronic document and page boxes thereof, in accordance with some embodiments.

FIG. 2 illustrates an example electronic document 200 and its associated page boxes. It should be appreciated that the electronic document 200 may be of various formats (e.g., PDF or others), and may have multiple page boxes, each defining definitions that related to a corresponding page. For description purposes, it may be assumed that the electronic document 200 has a single page.

A media box 205 specifies the width and height of the electronic document, which is typically larger than the size of a finished product. A trim box 215 represents the final, intended trimmed size of the product (i.e., the intended dimensions of the finished page). Generally, the trim box 215 is smaller than the media box 205.

A bleed box 210 defines a region to which images or objects may be extended beyond the intended edge of a page (i.e., the trim box 215), such as to accommodate any inaccuracies in trimming the printed media. Generally, the bleed box 210 is larger than the trim box 215 by anywhere from 1/16" to 1/4", or other values. An art box 220 defines the extent of meaningful content (e.g., artwork or other visual objects) for the page, as intended by a page designer.

According to embodiments, the systems and methods describe techniques for modifying various of the page boxes of a given electronic document based on dimensions or parameters associated with the design of a corresponding physical product. A "surface" as used herein may refer to a virtual representation of a customization area of a physical product. Additionally, a "surface size" as used herein may refer to the full dimensions (e.g., length and width) of the surface. Moreover, a "surface trim box" as used herein may refer to the position and dimensions of a finished product customized on the surface.

A computing device may implement or facilitate the described systems and methods for a given electronic document having a set of page boxes (in particular, media box, bleed box, trim box, and art box). In particular, the computing device may implement and support a software application that may facilitate a design of a product (e.g., the design application 160 as discussed with respect to FIG. 1B). The electronic document may have one or more images that constitute the design (generally, the "visual content"), where the visual content may or may not be defined by the art box. Additionally, the "page content bounds" of the electronic document is a box defining the bounds of the visual content, where the page content bounds may be inside or outside the bleed box and the trim box The computing device may initially detect a set of bounds for the content in the electronic document, such as based on whitespace or transparency around the edges of the electronic document. Additionally, the computing device may detect a set of crop marks that are defined in the electronic document and replace page box values accordingly. For example, the computing device may replace the values of the trim box with the parameters or dimensions of the set of crop marks (i.e., so that the set of crop marks define the trim box).

According to embodiments, the surface trim box as specified within the design customization may have an aspect ratio (e.g., width:height), and the trim box (e.g., the trim box 215) may also have an aspect ratio. The computing device may calculate the ratio between the aspect ratio of the surface trim box and the aspect ratio of the trim box, and compares the calculated difference to a threshold value. For example, if the aspect ratio of the surface trim box is 16:9 (i.e., 1.77:1) and the aspect ratio of the trim box is 3:2 (i.e., 1.5:1), the ratio between the two is approximately 0.85; and if the threshold value is 0.80, then the calculated difference is less than the threshold value.

If the calculated difference is less then (or does not exceed) the threshold value, the computing device may fit the trim box to the surface trim box with a given scaling mode. In particular, the computing device may replace the values of the trim box with the dimensions of the surface trim box. Additionally, the given scaling mode may be selected by a user or may be a default selection, and may be one of centered scaling, stretched scaling, aspect-ratio-preserving stretched scaling, or other types of over- or under-scaling. Moreover, the visual content of the electronic document may be modified to fit the new values of the trim box according to the given scaling mode.

On the contrary, if the calculated difference is more than (or at least exceeds) the threshold value, the computing device may identify the aspect ratios of the following objects: the page content bounds, the surface size, the bleed box, the trim box, and the surface trim box. Additionally, the computing device may calculate a difference between the aspect ratios of the following pairs of objects: (1) the page content bounds and the surface size, (2) the bleed box and the surface size, and (3) the trim box and the surface trim box.

Based on the calculated differences, the computing device may identify the aspect ratio pair having the smallest difference (i.e., (1), (2), or (3) described above). For instance, the computing device may determine that the aspect ratio difference between the bleed box and the surface size is the smallest. Additionally, the computing device may identify, for each scaling mode, a scaling factor for each of the pairs (1), (2), and (3). For example, the scaling factor needed to match the bleed box to the surface size may be different from the scaling factor needed to match the trim box to the surface trim box. Thus, the computing device may determine, for each scaling mode (e.g., centered scaling), the amount of scaling required between the objects in each pair (1), (2), and (3).

According to embodiments, each scaling mode may have two alternates: a first for the pair with the smallest aspect ratio difference, and a second for the pair with the smallest scaling factor. The computing device may rate or score each alternates based on various configurable thresholds to indicate the most likely candidates. In embodiments, the configurable thresholds may be: the maximum amount of percentage of space that should be cropped when over-scaling, the maximum amount or percentage of empty space that should remain when under-scaling or centering, the maximum aspect ratio deviation allowed when stretching, the minimum resolution of images allowed after scaling is applied, and/or others. In operation, two (or more) alternatives may produce the same effective outcome. For instance, if the input is an exact match to the surface, multiple scale modes would give the same outcome (i.e., scale factor 1). Accordingly, the computing device may flag or tag the alternatives with unique outcomes as possible results.

The computing device may generate preview images resulting from applying the scaling mode to the visual content. Further, the computing device may output a data structure that comprises placement information for each scaling mode considered, image information, and the generated preview images. In embodiments, the preview images may depict the transformations of the respective alternate placements.

Generally, the computing device may select or determine the aspect ratio pair that is the best alternate based on the rating or score, where the best alternate has an associated scaling mode. Further, the computing device may, using that scaling mode, fit the trim box to the target box of the selected aspect ratio pair. For example, if the selected aspect ratio pair is pair (1), the computing device may replace the values of the trim box with the dimensions of the surface size; if the selected aspect ratio pair is pair (2), the computing device may replace the values of the trim box with the dimensions of the surface size; or if the selected aspect ratio pair is pair (3), the computing device may replace the values of the trim box with the dimensions of the surface trim box. In embodiments, a user of the computing device may select an alternate via a user interface, such as in response to reviewing the preview images.

Figure 3:
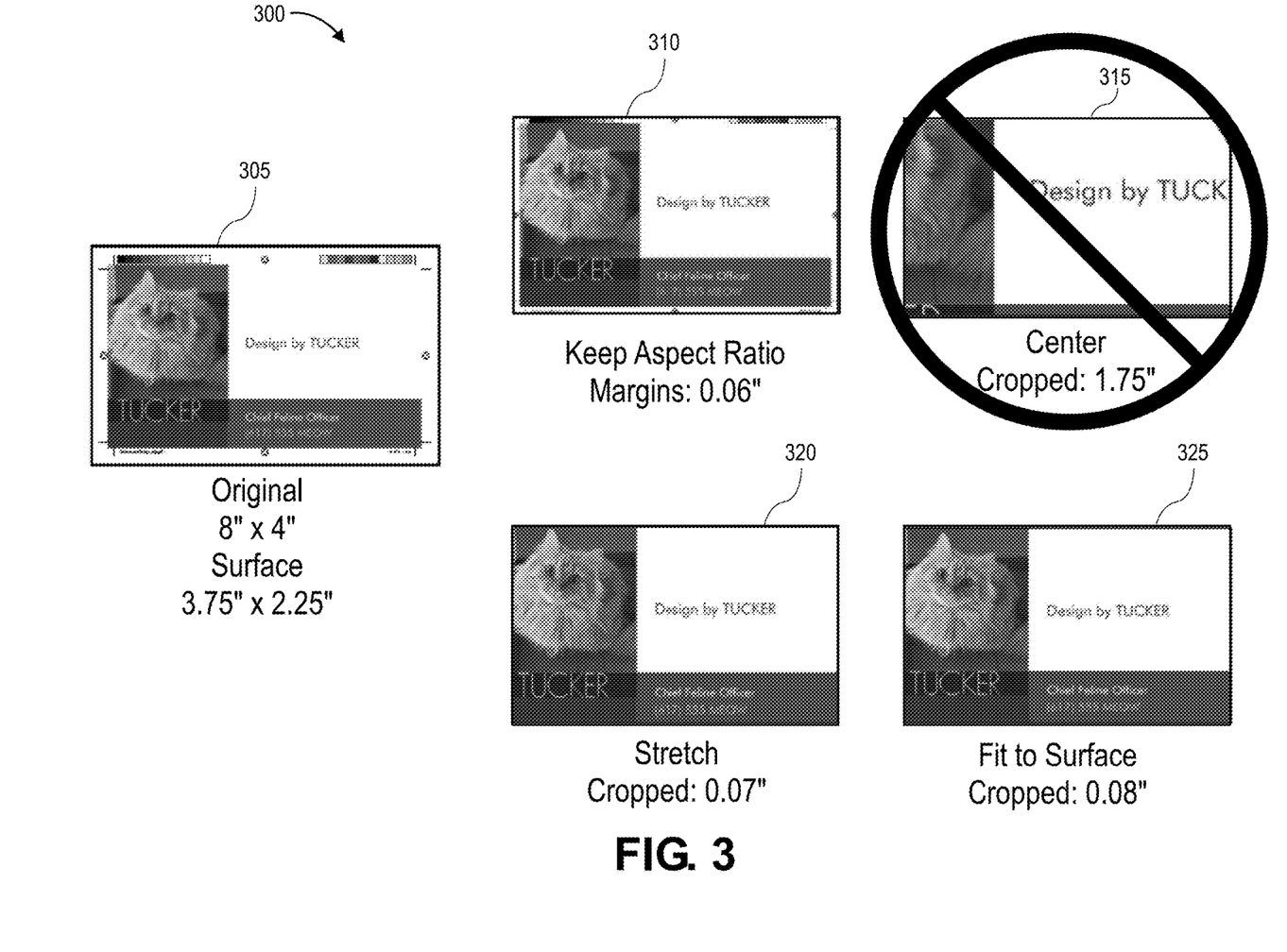
FIG. 3 depicts an example design and a set of preview images associated with the design, in accordance with some embodiments.

FIG. 3 depicts a layout 300 of an example design 305 along with a set of example preview images associated with the example design 305. According to embodiments, the design 305 includes a set of page boxes that may be modified according to the described systems and methods.

The preview images represent the design 305 after certain scaling factors have been applied to the visual content and after at least a portion of the set of page box parameters have been modified. In particular, a preview image 310 is associated with a scaling mode that preserves the aspect ratio margins, a preview image 315 is associated with a centering scaling mode, a preview image 320 is associated with a stretching scaling mode, and a preview image 325 is associated with a fit to surface scaling mode.

As illustrated in FIG. 3, the preview image 315 does not appear to be a good option, as the image of the cat and a portion of the text are cropped. According to embodiments, a user may review the set of preview images 310, 315, 320, 325 and select a desired one of the preview images. The systems and methods may facilitate production of products according to the selected preview image.

Figure 4A:
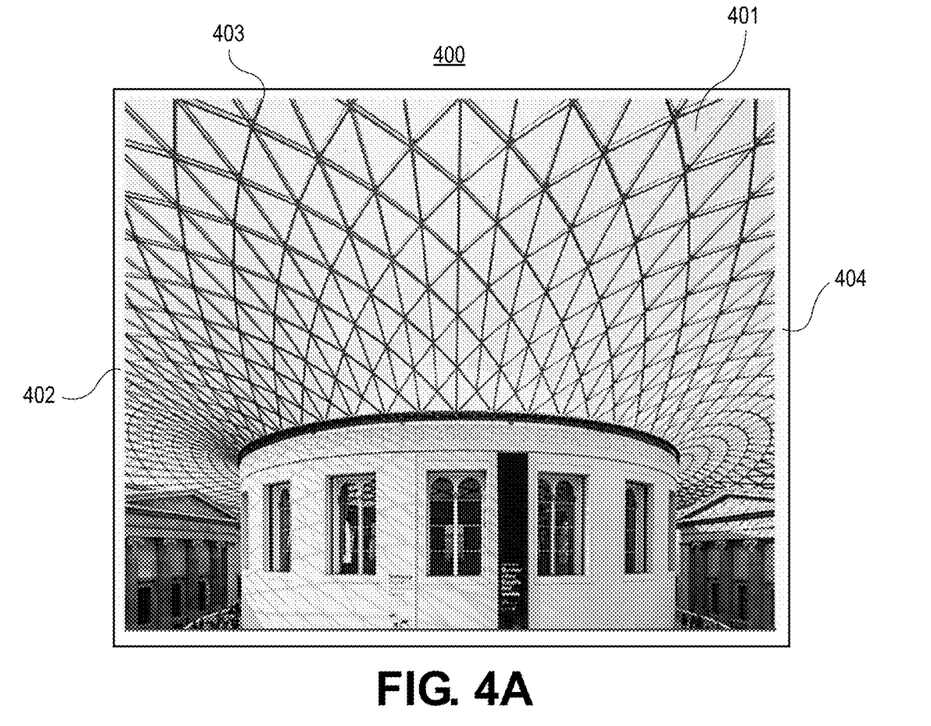
FIGS. 4A and 4B depict an example design that incorporates a bleed mirroring effect, in accordance with some embodiments.

FIG. 4A depicts an example design 400 encompassed in an electronic document having visual content 401. According to embodiments, the visual content 401 has been scaled to comply with modified page box parameters. However, as depicted in FIG. 4A, the design 400 includes areas 402, 403, 404 of white space on the sides of the design 400. Because the areas 402, 403, 404 of white space may not be desired in the final product, the systems and methods may facilitate "bleed mirroring" wherein portions of the visual content 401 may be "mirrored" into the areas 402, 403, 404 of white space.

Figure 4B:
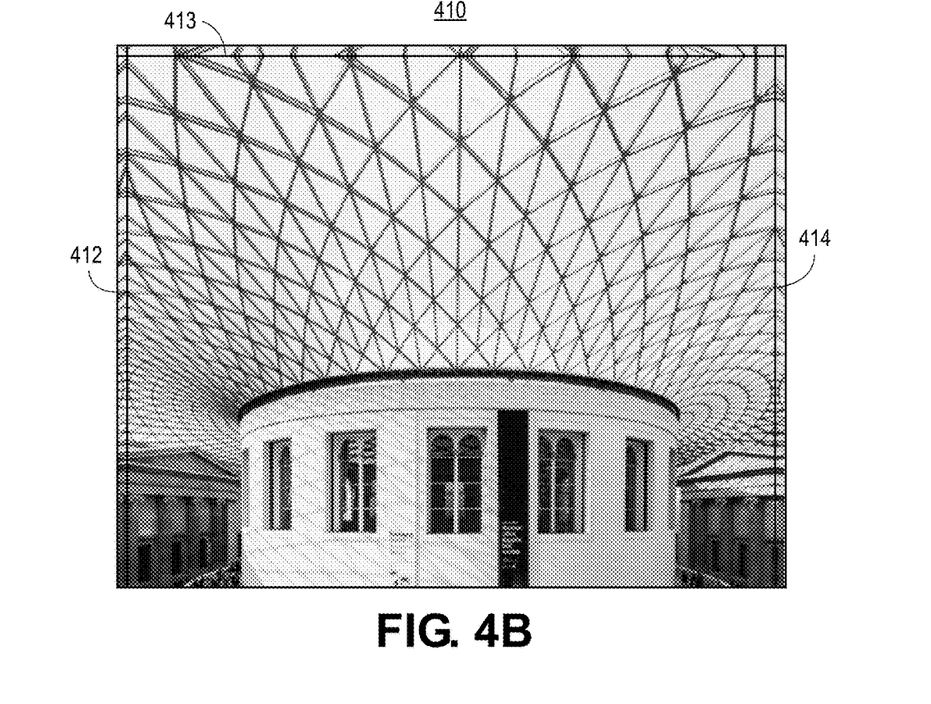

FIG. 4B depicts a modified design 410 after the bleed minoring technique is applied. In particular, the design 410 includes mirrored areas 412, 413, 414 corresponding to the areas 402, 403, 404 of white space. To facilitate the bleed mirroring, a computing device may minor or copy a portion(s) of the visual content 401 into the areas 402, 403, 404, where the mirrored portion(s) may be adjacent to the areas 402, 403, 404 of white space. As depicted in FIG. 4B, the mirrored area 412 corresponds to a mirrored portion on the left side of the design 401 as depicted in FIG. 4A, the mirrored area 413 corresponds to a mirrored portion on the top side of the design 401 as depicted in FIG. 4A, and the mirrored area 414 corresponds to a mirrored portion on the right side of the design 401 as depicted in FIG. 4A.

Figure 5:
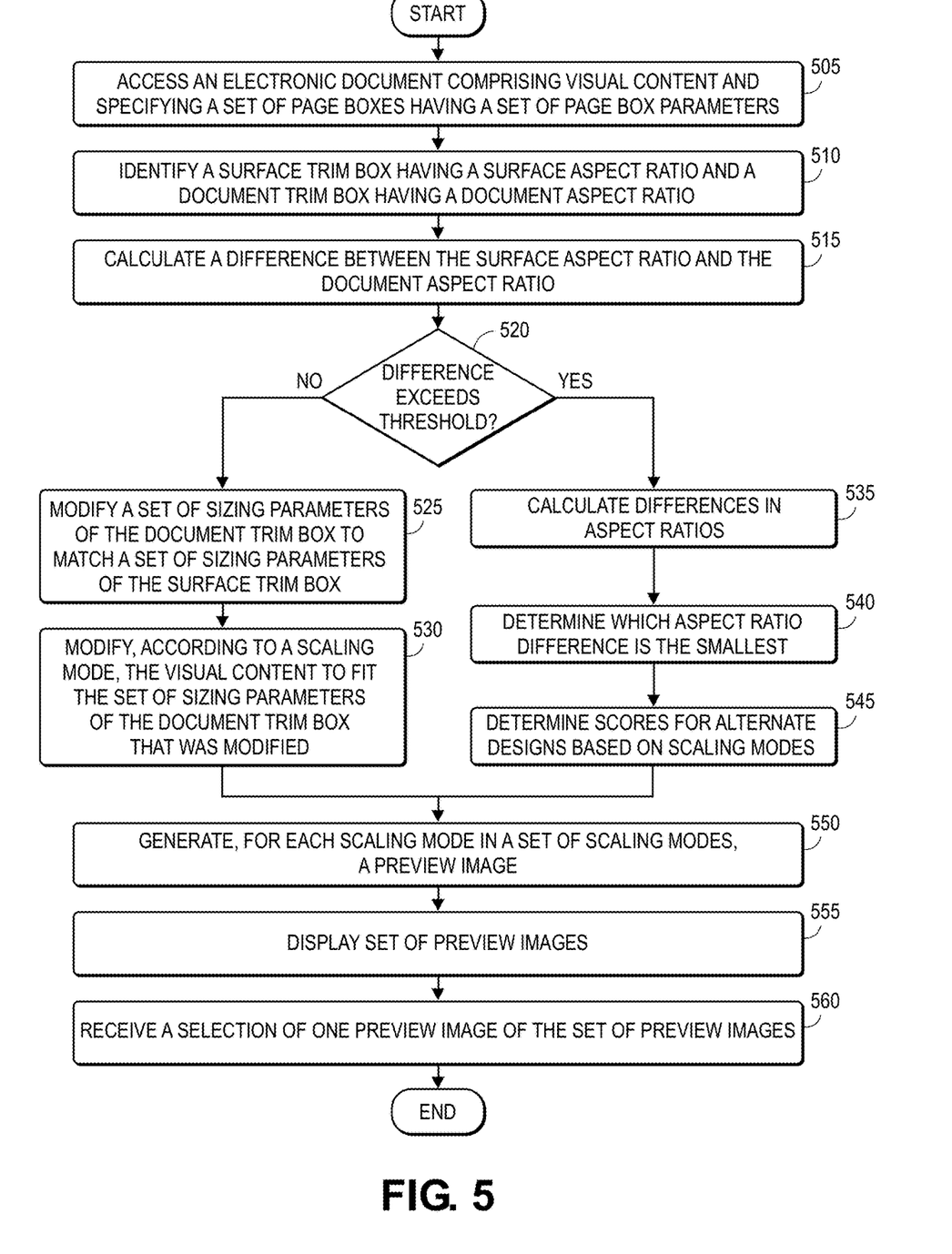
FIG. 5 depicts an example flow diagram associated with placing visual content on a virtual surface, in accordance with some embodiments.

FIG. 5 depicts is a block diagram of an example method 500 of placing visual content on a virtual surface for customizing a physical product. The method 500 may be facilitated by an electronic device (such as either of the devices 103, 104, 105 as depicted in FIG. 1A) that may be in communication with a server (such as the central server 110 as discussed with respect to FIG. 1A). In embodiments, the method 500 may be at least partially facilitated by a remote server, such as the central server 110 as discussed with respect to FIG. 1A. Further, as discussed herein, a surface may refer to a virtual representation of a customization area of a physical product, a surface size may refer to the full dimensions (e.g., length and width) of the surface, and a surface trim box may refer to the position and dimensions of a finished product customized on the surface.

The method 500 may begin when the electronic device access (block 505) an electronic document comprising visual content and specifying a set of page boxes having a set of page box parameters. In embodiments, the set of page boxes may be a media box, a bleed box, a trim box, and an art box. The electronic device may identify (block 510) a surface trim box defining the physical product placed on the virtual surface, the surface trim box having a set of sizing parameters defining a surface aspect ratio; and a document trim box (i.e., the trim box) included in the set of page boxes of the electronic document, the document rim box having a set of sizing parameters defining a document aspect ratio.

The electronic device may calculate (block 515) a difference between the surface aspect ratio and the document aspect ratio. The electronic device may compare the calculated difference to a threshold to determine (block 520) whether the calculated difference exceeds a threshold.

If the calculated difference does not exceed the threshold ("NO"), the electronic device may modify (block 525) the set of sizing parameters of the document trim box to match the set of sizing parameters of the surface trim box. Additionally, the electronic device may modify (block 530), according to a scaling mode, the visual content to fit the set of sizing parameters of the document trim box that was modified.

If the calculated difference does exceed the threshold ("YES"), the electronic device may calculate (block 535) (i) a second difference between an aspect ratio of a page content bounds of the electronic document and an aspect ratio of a surface size of the virtual surface, and (ii) a third difference between an aspect ratio of a bleed box included in the set of page boxes of the electronic document and the aspect ratio of the surface size. Additionally, the electronic device may determine (block 540) which of the difference between the surface aspect ratio and the document aspect ratio, the second difference, and the third difference, is the smallest.

Further, the electronic device may, for each scaling mode in a set of scaling modes (e.g., over-scaling, under-scaling, centering, stretching, etc.), calculate (i) a first scaling factor needed to match the document trim box to the surface trim box, (ii) a second scaling factor needed to match the page content bounds to the surface size, and (iii) a third scaling factor needed to match the bleed box to the surface size.

Additionally, the electronic device may determine (block 545) scores for alternate designs based on scaling modes. In particular, each scaling mode in the set of scaling modes may have a first alternate corresponding to the smallest of the difference between the surface aspect ratio and the document aspect ratio, the second difference, and the third difference, and a second alternate corresponding to the smallest of the first scaling factor, the second scaling factor, and the third scaling factor. Accordingly, for each scaling mode in the set of scaling modes, the electronic device may score each of the first alternate and the second alternate based on at least one configurable threshold. Based on scoring each of the first alternate and the second alternate, the electronic device may determine at least one alternate having the highest score. The electronic device may modify at least a portion of the set of page box parameters In some implementations, at block 550, the electronic device may, for each scaling mode in the set of scaling modes, generating a preview image by applying the scaling mode to the visual content of the electronic document according to at least the portion of the set of page box parameters that was modified. The electronic device may also display, in a user interface, (block 555) the set of preview images and receive (block 560), via the user interface, a selection of one preview image of the set of preview images. In embodiments, the electronic device may facilitate a product order according to the selected image and any modified page box parameters.

Figure 6:
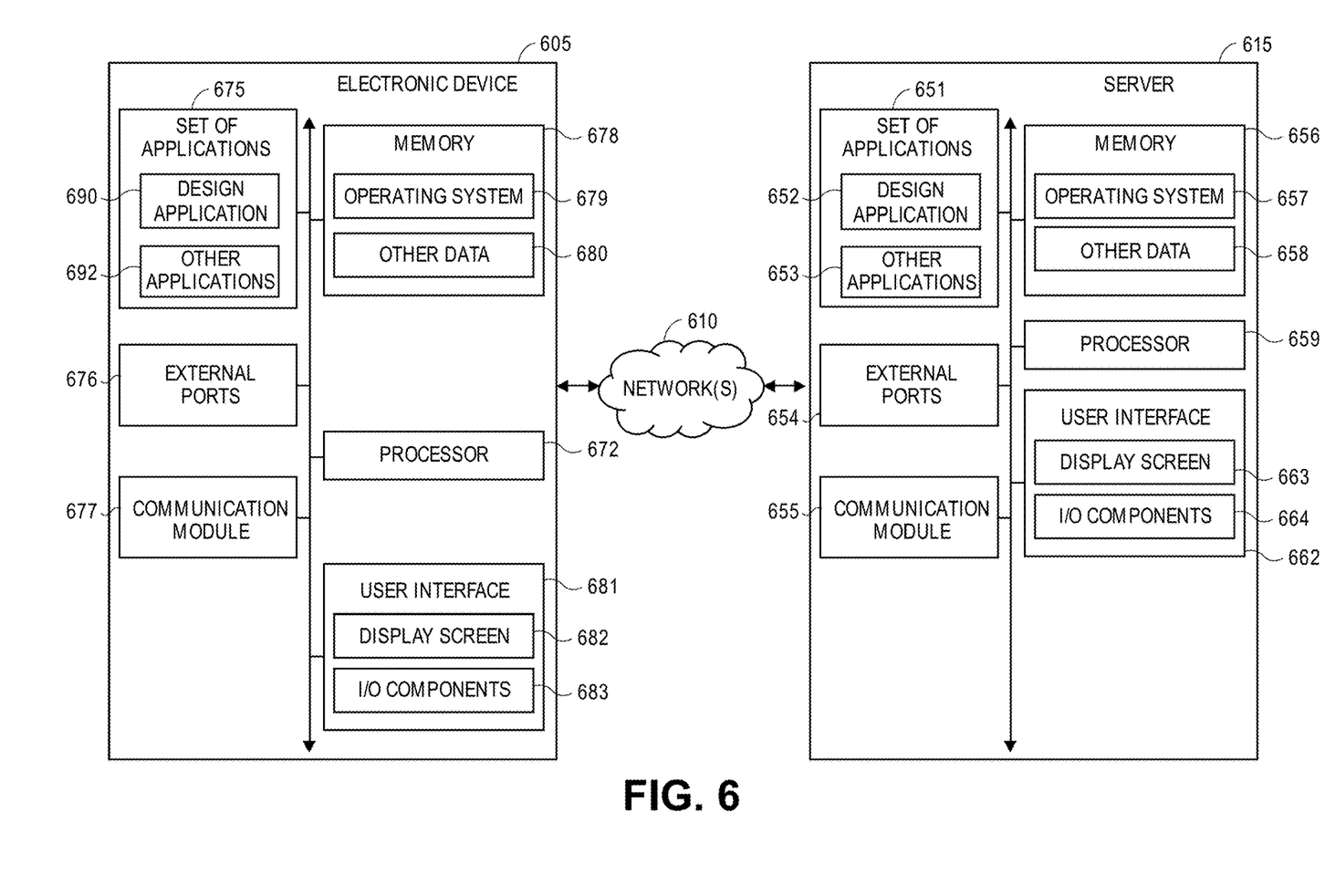
FIG. 6 is a block diagram of an example electronic device and an example server, in accordance with some embodiments.

FIG. 6 illustrates a hardware diagram of an example electronic device 605 (such as one of the electronic devices 103, 104, 105 as discussed with respect to FIG. 1A) and an example server 615 (such as the server computer 110 as discussed with respect to FIG. 1A), in which the functionalities as discussed herein may be implemented.

The electronic device 605 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be a design application 690 configured to facilitate functionalities associated with modifying electronic document parameters, as discussed herein. It should be appreciated that one or more other applications 692 are envisioned.

The processor 672 may interface with the memory 678 to execute the operating system 679 and the set of applications 675. According to some embodiments, the memory 678 may also include other data 680 including data associated with collected documentation and/or other data. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 605 may further include a communication module 677 configured to communicate data via one or more networks 610. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 may communicate with the server 615 via the network(s) 610.

The electronic device 605 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs). According to some embodiments, the user may access the electronic device 605 via the user interface 681 to review various designs and preview images, and make various selections.

In some embodiments, the electronic device 605 may perform the functionalities as discussed herein as part of a "cloud" network or may otherwise communicate with other hardware or software components within the cloud to send, retrieve, or otherwise analyze data.

As illustrated in FIG. 6, the electronic device 605 may communicate and interface with the server 615 via the network(s) 610. The server 615 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be a design application 690 configured to facilitate functionalities associated with modifying electronic document parameters, as discussed herein. It should be appreciated that one or more other applications 653 are envisioned.

The processor 659 may interface with the memory 656 to execute the operating system 657 and the set of applications 651. According to some embodiments, the memory 656 may also include other data 658, such as data associated with a data model, data received from the electronic device 605, and/or other data. The memory 656 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 615 may further include a communication module 655 configured to communicate data via the one or more networks 610. According to some embodiments, the communication module 655 may include one or more transceivers (e.g., WWAN, WLAN, and/or WPAN transceivers) functioning in accordance with IEEE standards, 3GPP standards, or other standards, and configured to receive and transmit data via one or more external ports 654.

The server 615 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs). According to some embodiments, the user may access the server 615 via the user interface 662 to review information, make selections, and/or perform other functions.

In some embodiments, the server 615 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of placing visual content on a virtual surface for customizing a physical product, the method comprising:

accessing, by a computer processor, an electronic document comprising the visual content and specifying a set of page boxes having a set of page box parameters;

identifying (i) a surface trim box defining the physical product placed on the virtual surface, the surface trim box having a set of sizing parameters defining a surface aspect ratio, and (ii) a document trim box included in the set of page boxes of the electronic document, the document trim box having a set of sizing parameters defining a document aspect ratio;

calculating, by the computer processor, a difference between the surface aspect ratio and the document aspect ratio;

determining that the difference between the surface aspect ratio and the document aspect ratio exceeds a threshold;

calculating (i) a second difference between an aspect ratio of a page content bounds of the electronic document and an aspect ratio of a surface size of the virtual surface, and (ii) a third difference between an aspect ratio of a bleed box included in the set of page boxes of the electronic document and the aspect ratio of the surface size; and determining which of the difference between the surface aspect ratio and the document aspect ratio, the second difference, and the third difference, is the smallest.

2. The computer-implemented method of claim 1, further comprising:

for each scaling mode in a set of scaling modes, calculating (i) a first scaling factor needed to match the document trim box to the surface trim box, (ii) a second scaling factor needed to match the page content bounds to the surface size, and (iii) a third scaling factor needed to match the bleed box to the surface size.

3. The computer-implemented method of claim 2, wherein the set of scaling modes comprises: over-scaling, under-scaling, centering, and stretching.

4. The computer-implemented method of claim 2, wherein each scaling mode in the set of scaling modes has a first alternate corresponding to the smallest of the difference between the surface aspect ratio and the document aspect ratio, the second difference, and the third difference, and a second alternate corresponding to the smallest of the first scaling factor, the second scaling factor, and the third scaling factor, and wherein the method further comprises:

for each scaling mode in the set of scaling modes, scoring each of the first alternate and the second alternate based on at least one configurable threshold.

5. The computer-implemented method of claim 4, further comprising:

based on scoring each of the first alternate and the second alternate, determining at least one alternate having the highest score.

6. The computer-implemented method of claim 1, further comprising:

for each scaling mode in a set of scaling modes, generating a preview image by applying the scaling mode to the visual content of the electronic document; and displaying, in a user interface, the preview image corresponding to each scaling mode in the set of scaling modes.

7. The computer-implemented method of claim 6, further comprising:

receiving, via the user interface, a selection of one preview image displayed in the user interface.

8. The computer-implemented method of claim 1, further comprising:

mirroring at least a portion of the visual content to fit a bleed box included in the set of page boxes.

9. An electronic device for placing visual content on a virtual surface for customizing a physical product, comprising:

a user interface for displaying content;

a memory storing non-transitory computer executable instructions; and a processor interfacing with the user interface and the memory, wherein the processor is configured to execute the non-transitory computer executable instructions to cause the processor to:

access an electronic document comprising the visual content and specifying a set of page boxes having a set of page box parameters, identify (i) a surface trim box defining the physical product placed on the virtual surface, the surface trim box having a set of sizing parameters defining a surface aspect ratio, and (ii) a document trim box included in the set of page boxes of the electronic document, the document trim box having a set of sizing parameters defining a document aspect ratio, calculate a difference between the surface aspect ratio and the document aspect ratio, determine that the difference between the surface aspect ratio and the document aspect ratio exceeds a threshold, calculate (i) a second difference between an aspect ratio of a pace content bounds of the electronic document and an aspect ratio of a surface size of the virtual surface, and (ii) a third difference between an aspect ratio of a bleed box included in the set of page boxes of the electronic document and the aspect ratio of the surface size, and determine which of the difference between the surface aspect ratio and the document aspect ratio, the second difference, and the third difference, is the smallest.

10. The electronic device of claim 9, wherein the processor is further configured to:

for each scaling mode in a set of scaling modes, calculate (i) a first scaling factor needed to match the document trim box to the surface trim box, (ii) a second scaling factor needed to match the page content bounds to the surface size, and (iii) a third scaling factor needed to match the bleed box to the surface size.

11. The electronic device of claim 10, wherein the set of scaling modes comprises: over-scaling, under-scaling, centering, and stretching.

12. The electronic device of claim 10, wherein each scaling mode in the set of scaling modes has a first alternate corresponding to the smallest of the difference between the surface aspect ratio and the document aspect ratio, the second difference, and the third difference, and a second alternate corresponding to the smallest of the first scaling factor, the second scaling factor, and the third scaling factor, and wherein the processor is further configured to:

for each scaling mode in the set of scaling modes, score each of the first alternate and the second alternate based on at least one configurable threshold.

13. The electronic device of claim 12, wherein the processor is further configured to:

based on scoring each of the first alternate and the second alternate, determine at least one alternate having the highest score.

14. The electronic device of claim 9, further comprising:

a user interface;

wherein the processor is further configured to:
   for each scaling mode in a set of scaling modes, generate a preview image by applying the scaling mode to the visual content of the electronic document, and
   cause the user interface to display the preview image corresponding to each scaling mode in the set of scaling modes.

15. The electronic device of claim 14, wherein the processor is further configured to:
   receive, via the user interface, a selection of one preview image displayed in the user interface.

16. The electronic device of claim 14, wherein the processor is further configured to:
   mirror at least a portion of the visual content to fit a bleed box included in the set of page boxes.

* * * * *

UNITED STATES PATENT AND TRADEMARK OFFICE
CERTIFICATE OF CORRECTION

PATENT NO. : 11,029,895 B2  
APPLICATION NO. : 16/681439  
DATED : June 8, 2021  
INVENTOR(S) : Harrison Paine et al.

Page 1 of 1

It is certified that error appears in the above-identified patent and that said Letters Patent is hereby corrected as shown below:

In the Claims

At Column 16, Line 29, "pace" should be -- page --.

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*